United States Patent [19]

Yager et al.

[11] Patent Number: 5,350,483
[45] Date of Patent: Sep. 27, 1994

[54] IN-MOLD LABELING INSERTION APPARATUS AND METHOD

[75] Inventors: Joseph C. Yager, Toledo; John D. Schuster, Sylvania, both of Ohio

[73] Assignee: Avery-Dennison Corporation, Pasadena, Calif.

[21] Appl. No.: 632,174

[22] Filed: Dec. 21, 1990

[51] Int. Cl.$^5$ .............................................. B29C 49/24
[52] U.S. Cl. .................................. 156/571; 156/245; 156/DIG. 31; 264/509; 318/135; 425/503
[58] Field of Search ............... 156/245, 571, DIG. 31; 264/509; 425/126.1, 503, 522, 539; 310/12; 318/135

[56] References Cited

U.S. PATENT DOCUMENTS

| | | | |
|---|---|---|---|
| 4,355,967 | 10/1982 | Hellmer | 425/503 |
| 4,456,934 | 6/1984 | Wedman et al. | 318/135 X |
| 4,479,771 | 10/1984 | Slat et al. | 264/509 X |
| 4,616,992 | 10/1986 | Oles | 264/509 X |
| 4,639,207 | 1/1987 | Slat et al. | 264/509 X |
| 4,737,098 | 4/1988 | Oles et al. | 264/509 X |
| 4,794,284 | 12/1988 | Buon | 318/135 X |
| 4,834,641 | 5/1989 | Keyser | 425/503 |
| 4,917,592 | 4/1990 | Plenzler et al. | 156/DIG. 31 X |
| 4,983,348 | 1/1991 | Barresi et al. | 425/503 X |
| 5,026,266 | 6/1991 | Takasaki et al. | 264/509 X |
| 5,075,583 | 12/1991 | Sakagami et al. | 310/12 |

*Primary Examiner*—David A. Simmons
*Assistant Examiner*—James J. Engel, Jr.
*Attorney, Agent, or Firm*—Arthur B. Moore; Charles Schroeder

[57] ABSTRACT

A label inserter and method for supply of labels to a mold of a blow molding machine for the production of in-mold labeled plastic products in which a label carrying, vertically liftable beam extending from a carriage driven by a computer controlled linear motor sets labels in the recesses of a mold as it moves into alignment for receipt of a portion of parison to be blown into the desired product. As disclosed the mold is driven along an upwardly inclined path toward the parison and the linear drive support and carriage are drawn thereby along a parallel path in unison with the mold. After insertion of labels, the beam is withdrawn for receipt of additional labels whereupon the carriage and label loaded beam are advanced to a position just outside the path of mold movement to await return and opening of the mold for another cycle of label insertion. Label holders on both sides of the insert beam swing outwardly for receipt of labels and for deposition of labels in the recessed walls of the mold.

28 Claims, 14 Drawing Sheets

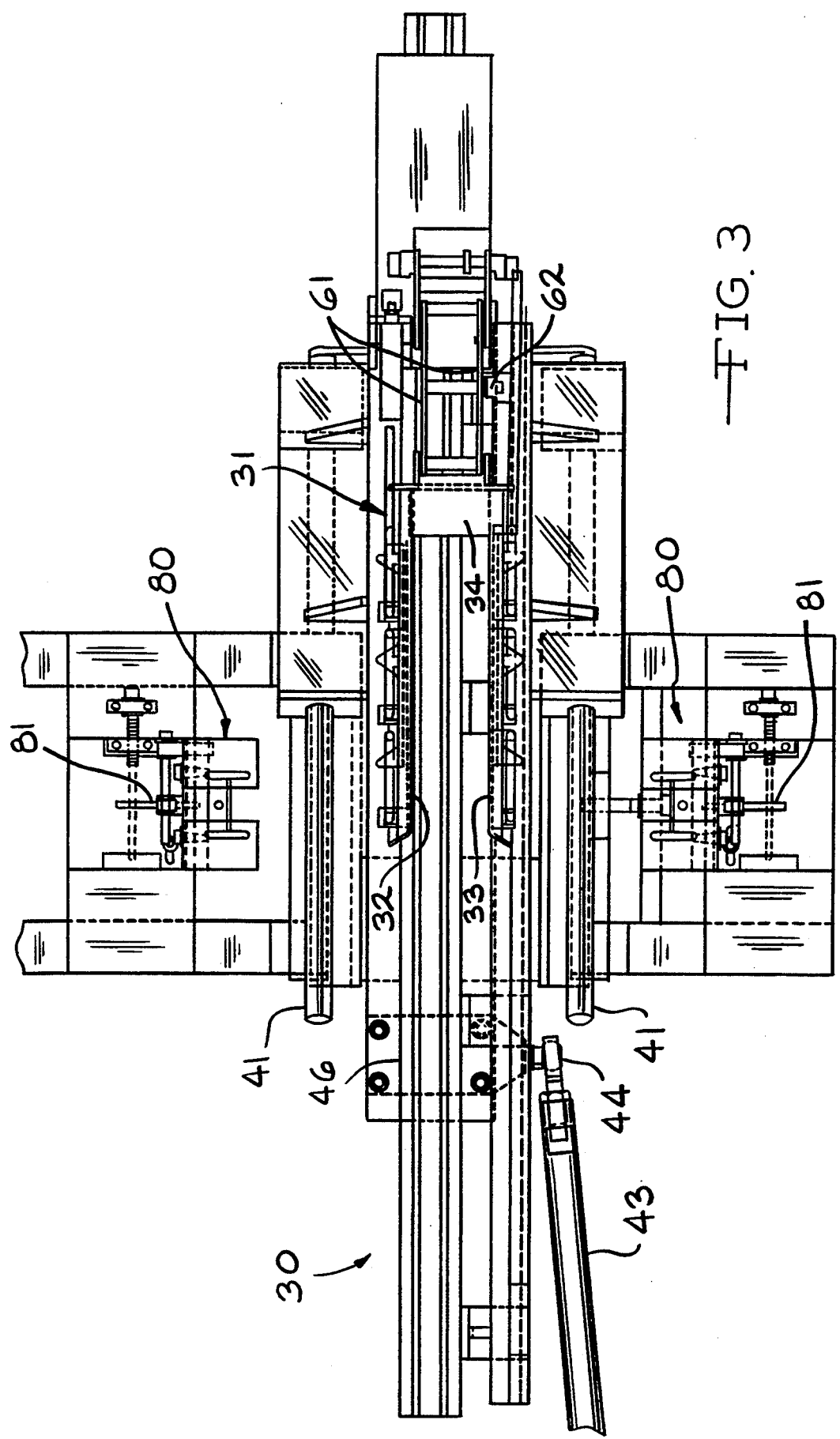

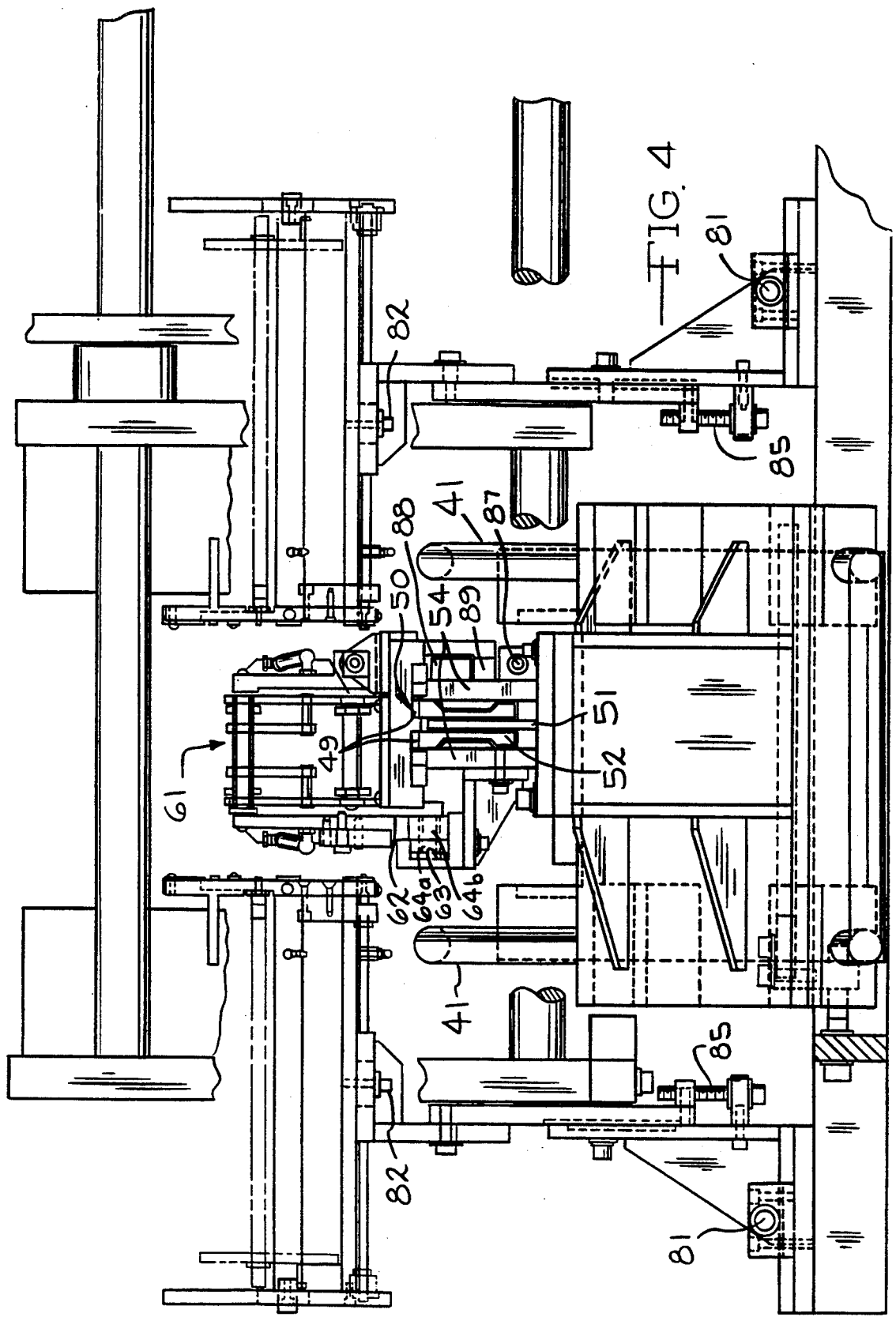

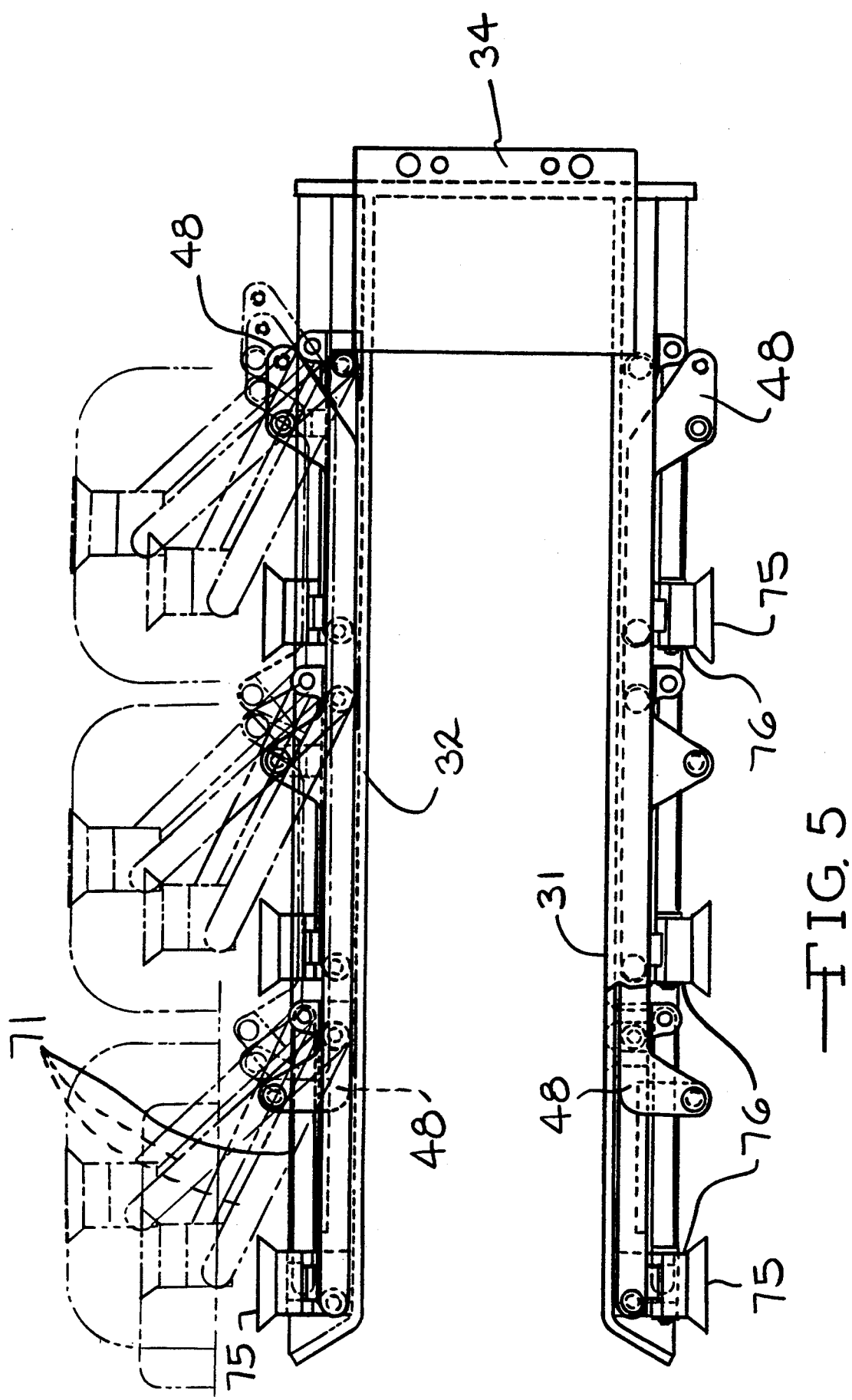

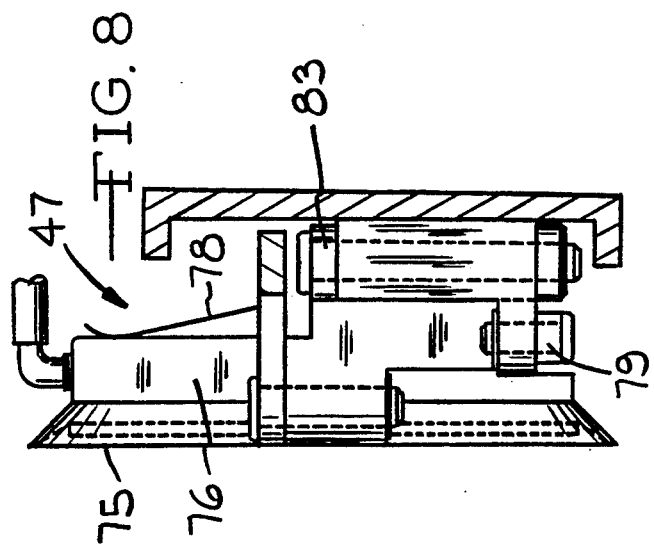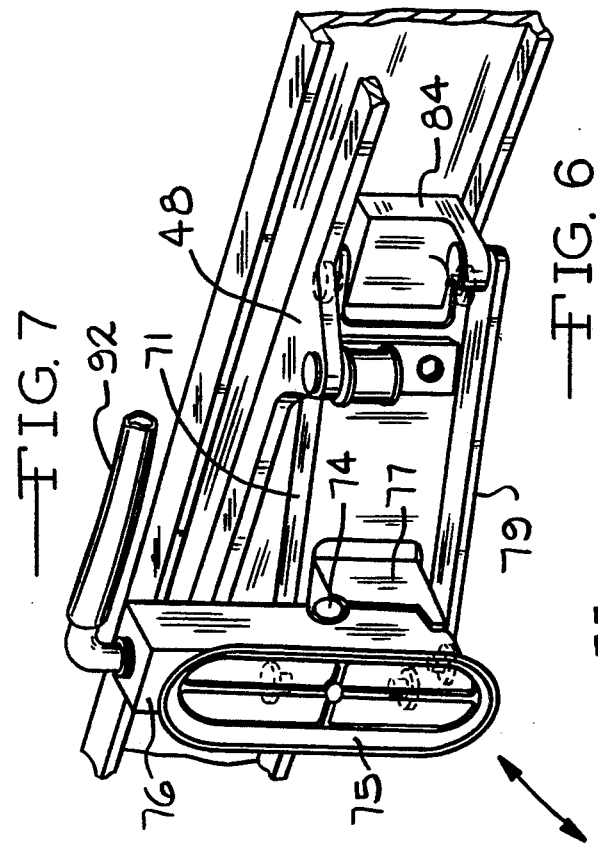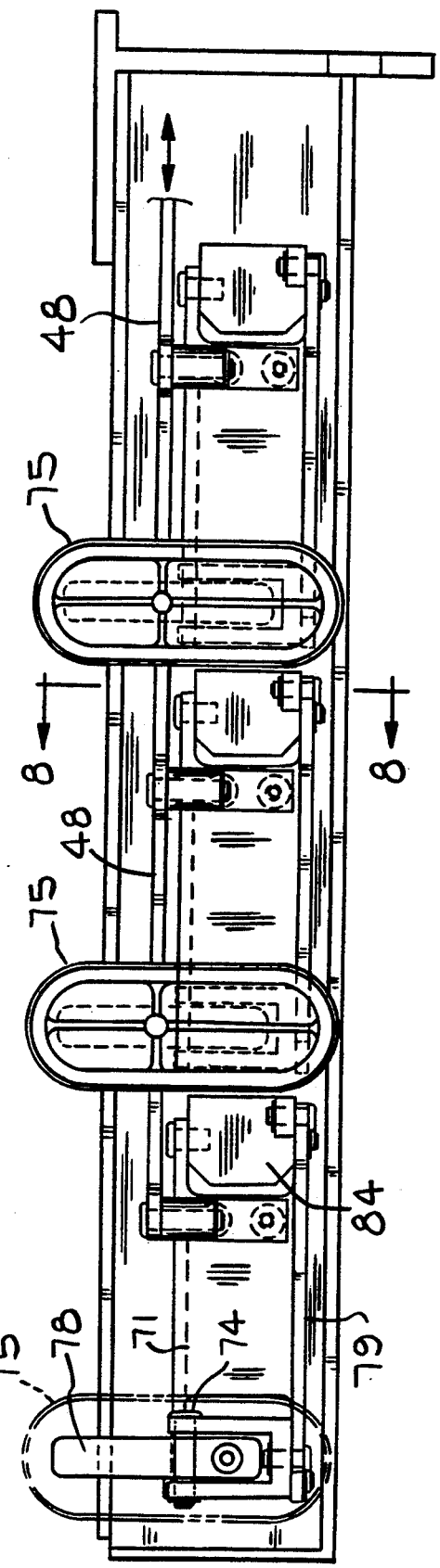

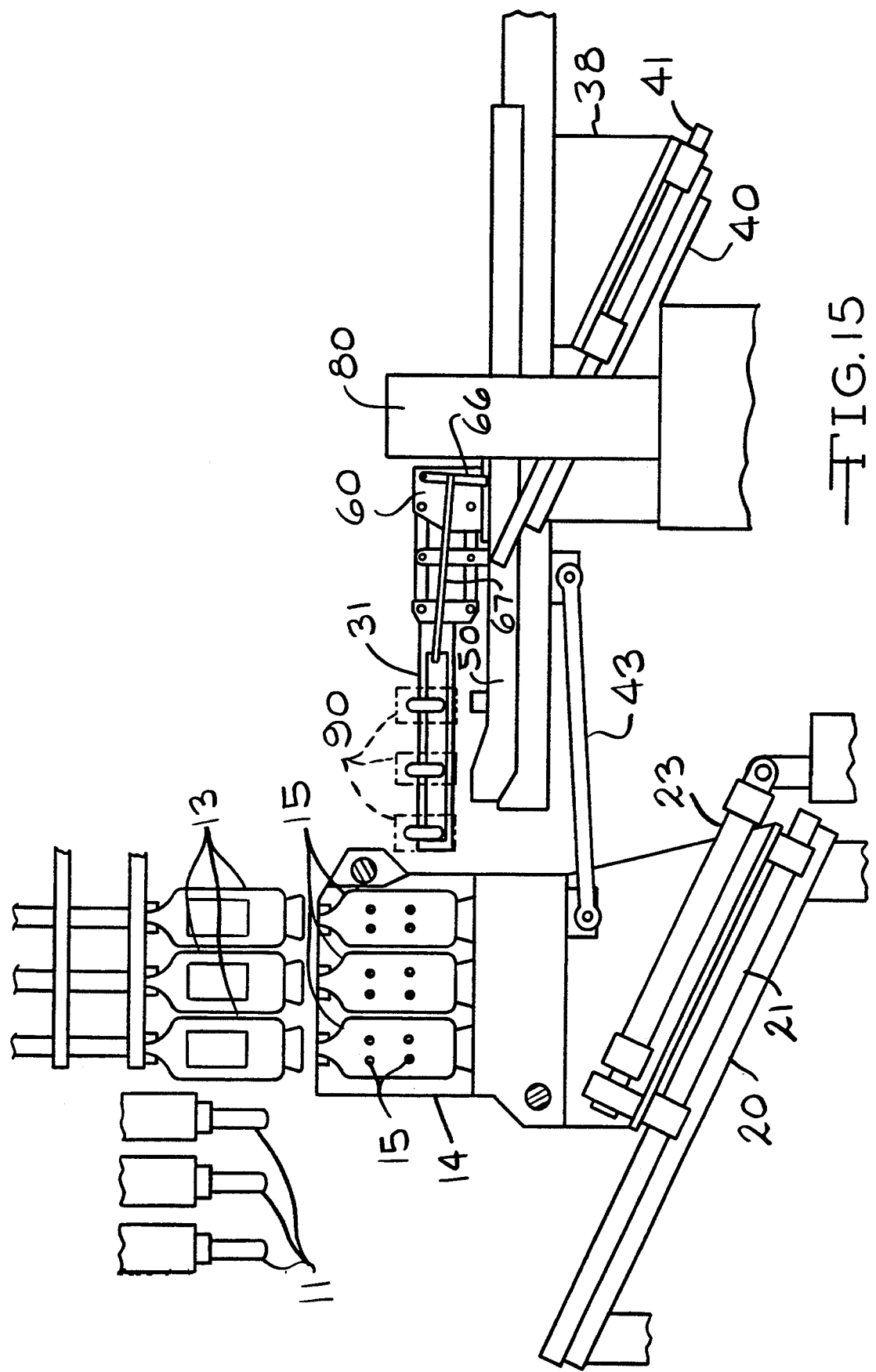

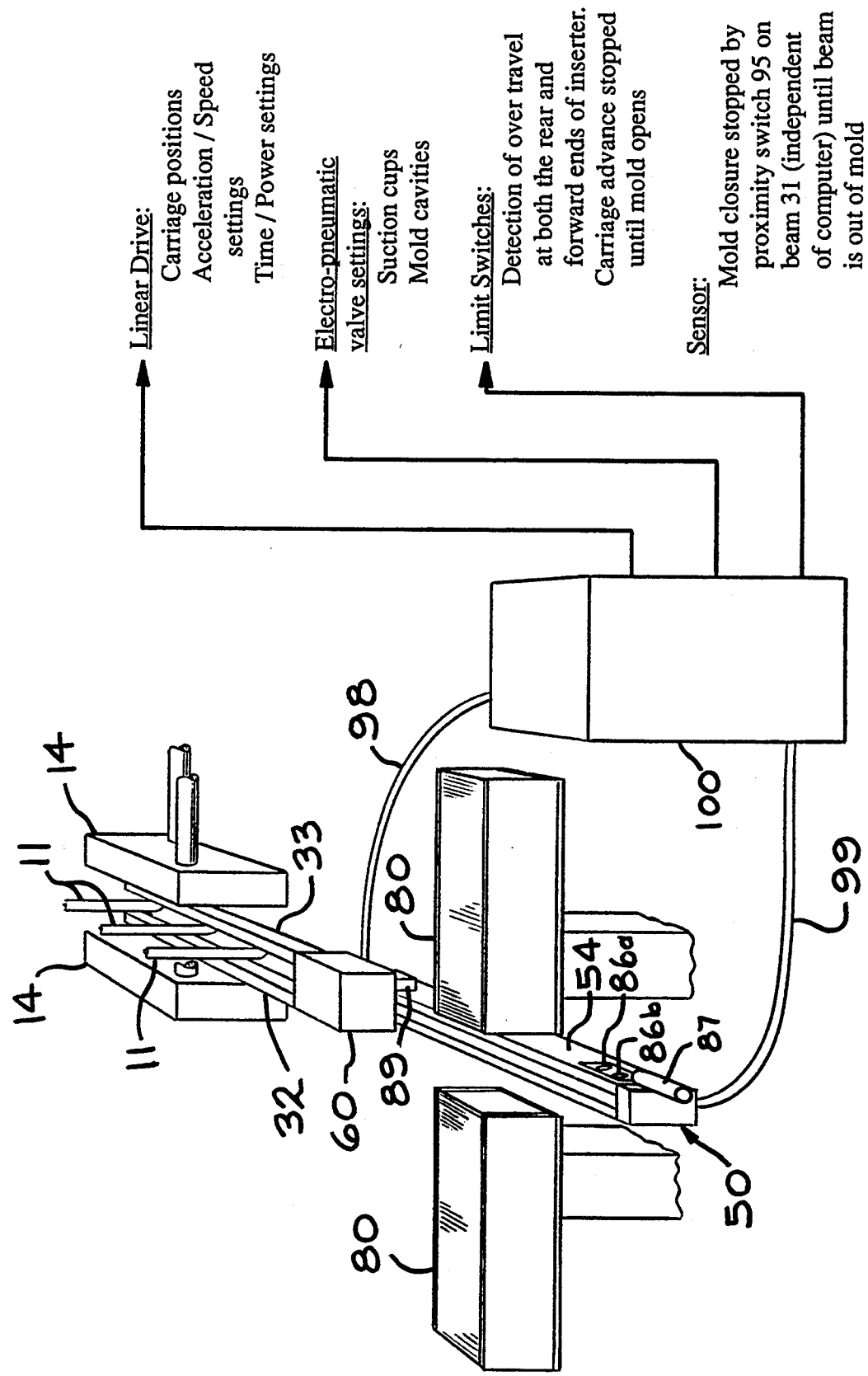

IN-MOLD LABELING INSERTION APPARATUS AND METHOD

FIELD OF THE INVENTION

The present invention is a machine and method for inserting labels in molds in a process for making labeled molded resinous products commonly referred to as an in-mold labeling process. More particularly the invention is a machine and, method for inserting labels in mold cavities during the process of making synthetic resinous bottle containers wherein labels are inserted into open mold cavities in a matter of fractions of a second prior to the mold halves closing about a parison to produce a desired container. Each label is laid against its respective mold cavity wall and held therein as it closes about the resinous parison. Upon cut off of the parison, a supply of air is blown into the resin therein to make it conform to the mold contours with the label on the cavity wall being correspondingly molded upon the resinous container wall.

BACKGROUND

In producing a synthetic resinous container, such as a polyethylene bottle or a container of other plastic materials, a semi-fluid tubular parison either of one or multiple layers of resin is fed from an overhead extruding head downwardly between two halves of a mold which are brought into alignment on opposite sides of the parison. Upon closure of the molds about the parison it is then cut free of the mold. During closure of the mold halves about the parison, the parison is still in motion downwardly from the extruder and the mold being closed thereabout must be moved downwardly with the parison to avoid critical extruder operational inefficiencies otherwise experienced by interruption of parison flow. The closed mold is thereupon withdrawn laterally from the extruder station for blowing thus allowing the end of the parison to continue its downward flow from the extruder outlet above ready for receipt by another mold. In the withdrawn lateral position of the mold, the mold halves are opened and the blown bottle is released therefrom.

When labels are supplied to the mold, usually one to each mold half, means for inserting and applying the labels to the walls of the open halves is provided which must act quickly before the two halves close about the parison otherwise impart a time delay in the molding cycle. In the usual shuttle machine for producing containers in this manner, two complete sets of moveable mold halves are provided on opposite sides of the path of flow of the parison. First one open set of mold halves is moved into place from its lateral position into alignment on opposite sides of the parison and then closed about the parison to form the desired container. The parison is then cut free of the mold and the closed mold is withdrawn to a lateral position for blowing to conform to the mold cavity and removal of the container. Simultaneously the second open mold set is brought into place on opposite sides of the parison for closure to form another container. The second mold set is thereupon withdrawn for blowing and removal of a container and return to its beginning position. This process cycle is repeated continuously, alternating the mold sets between one side and the other of the parison thereby allowing the parison to flow continuously from the extruder without interruption.

Since the mold halves are closed about the parison while the parison is in downward motion, the mold set must be moved downwardly at a rate corresponding to the rate of motion of the parison to prevent flow interruption. A means is therefore provided to move the closed mold downwardly with the parison during the momentary confinement of the parison in the mold before and during cutoff and withdrawal to a lateral position where the container is removed upon opening the mold halves.

To allow the downward movement of the mold with the parison the mold halves are usually arranged first to be brought up to an upper level position on opposite sides of the parison path and as the end of the downward moving parison reaches the bottom of the mold halves, closure of the mold is already initiated and occurs quickly to allow cutoff of the parison above and lateral withdrawal of the closed mold to avoid interruption of the parison flow. The second set of mold halves on the opposite side of the parison thereupon comes into position in the upper region to start the cycle of container formation over again.

Since it is important for efficiency of operation that the parison flow from the extruder not be interrupted, the time available is quite limited for insertion of labels on the walls of the mold halves without incurring a delay in the production cycle. This requires rapid action by the mechanism for inserting the labels on the walls of the mold halves. That is, the label inserter must get in between the mold halves quickly while they are open and get out quickly before the space between the closing mold halves becomes too small for the mechanism to be safely present therein.

The shuttle type machine most commonly used in the container manufacturing industry has two confronting mold supporting platens extending laterally outward from the machine, one for each mold half. The inside platen closest to the machine is hydraulically driven directly toward the outside platen while the outside platen is drawn to the other in cooperation therewith through a rack and pinion gear assembly to drive the two together or away from each other. The outside moveable platen is supported in cantilevered fashion by two heavy support rods, one in an upper position on one side of the mold halves and the other in a diagonally opposite low position below the level of the two mold halves. Accordingly beside being capable of acting at a high speed, the mechanism must be compact enough to fit and be able to accommodate its operation to those of the molding operations as well as the position of components of the molding apparatus throughout the product molding cycle.

In light of the foregoing it is a principal object of the present invention to provide label insertion equipment and a method for supplying labels to mold cavities of shuttle type in-mold labeling apparatus with minimum or no delay in the molding cycle for producing the labeled synthetic resin products.

It is another important object of the invention to provide label insertion equipment for inserting labels into molds of in-mold label production apparatus adaptable to the space confines surrounding such production apparatus.

It is still another object of the invention to provide label insertion equipment and a method for inserting labels into molds of in-mold label production apparatus flexibly adaptable to the time cycle of production as well as the involved motion dynamics of the labeled product production apparatus.

SUMMARY OF THE INVENTION

The invention is a mechanical arrangement and method wherein the inserter because of its rapidity can be moved into a position adjacent the mold to await opening of the mold halves whereupon labels backed by heat activated adhesive can be inserted into the mold recesses with a minimum of travel time so that a minimum or no delay is introduced to the product production cycle. To effect rapid insertion of labels once in between mold halves, a narrow structural beam including two spaced parallel insert arms which reach about opposite sides of the parison path, is provided with label holders positioned on the outside surfaces of the arms. The spaced arms reach about both sides of a parison path to effect insertion of the labels in the recesses of oppositely disposed matching mold halves. The insert beam projects forwardly from a carriage driven by an electrical linear drive motor which functions multipurposefully in providing support, driving power, guidance and incremental control of the position of the carriage in all phases of its cycle of operation. In this regard the invention includes a conventional digital computer control, which can provide incremental position, time and power settings for the inserter, either for its individual operation or cooperative operation with the molding machine. The product molding equipment and the label inserting equipment are physically moved in parallel such that even though in motion separately according to separate individual cycles of operation, in their overall operational relationship they appear stationary to each other.

In order for a label to be supplied to a mold cavity 15, usually in either the mid-region or upper region of the cavity of each mold half, the label carrying mechanism reaching in between open mold halves often must reach under a heavy cantilevered bar supporting the outer mold half mounting platen. Thus the inserter beside reaching in and out from between the mold halves must move quickly upward therebetween as well to avoid the obstruction presented by a support bar. The cantilevered forwardly projecting arms or beam supporting the label holders is advantageous in that the beam can be arranged to be lifted upwardly on the carriage by a contoured cam as the carriage is moved horizontally forward. The label holders are thus lifted up into the molds after passage under the heavy support bar for the outer mold support platen. Correspondingly upon withdrawal, the cantilevered beam extending from its linearly driven carriage is lowered as determined by the cam profile to assure free passage under the otherwise obstructing heavy support rod.

Other objects and features which are characteristic of the invention are set forth with particularity in the appended claims. The invention, however, both in organization and construction, together with further objects and features thereof may be best understood by reference to the following description taken in connection with the accompanying drawings.

THE DRAWINGS

FIG. 3 is a detailed top plan view of the label inserting apparatus of FIG. 1 and 2 showing the label carriage on a linear drive motor;

FIG. 4 is a rear end elevation view of the label inserting apparatus of FIG. 2;

FIG. 5 is a top plan view of the insertion beam of the apparatus of FIG. 4 with three label carrying extension arms on one insert arm shown in partially and fully extended positions shown in dotted lines which the three extension arms on the opposite insert arm are shown in their resident positions at the side of their insert arm of the beam;

FIG. 6 is a detailed side elevation view of the face of a side arm of the insertion beam of FIG. 5 with the three label holder extension arms thereon in side-by-side relation.

FIG. 7 is a perspective view of an extension arm of FIG. 6 shown in partially extended position;

FIG. 8 is a detailed sectional elevation view in profile of a label holder extension arm of FIG. 6 taken on line 8—8;

FIGS. 9 to 15 illustrate in cross section through the mold the apparatus of FIG. 1 and 2 to 4 in step-by-step positions of components of the label inserter and the mold machine with the inserter beam arranged to extend into the multiple cavity mold for three containers and the relative position of the beam and label holders to three parison flow stations throughout the container molding cycle;

FIG. 9 shows the label carrying inserter of FIG. 1 advanced toward a stop position just outside the mold.

FIG. 10 shows partial advance of the inserter beam of FIG. 9 in between the open mold halves;

FIG. 11 shows full advance of the inserter of FIG. 10 in a-raised position between the mold halves for application of labels to the cavities of matched mold halves as both the mold halves and the inserter are advancing to the parison station;

FIG. 12 shows the open mold halves in FIG. 11 being moved upwardly into aligned position for receipt of a parison between each matched pair of mold cavities with the inserter being withdrawn from between the mold halves before they close about the parison;

FIG. 13 shows the closed mold of FIG. 12 being withdrawn downwardly after being cut at the parison station and showing the inserter also moved downwardly and back to the label magazine station;

FIG. 14 shows both the mold and the inserter of FIG. 13 fully withdrawn to their lower level while the containers are blown in the mold cavities and labels are being picked up by the inserter at the label magazine station;

Figure 9:
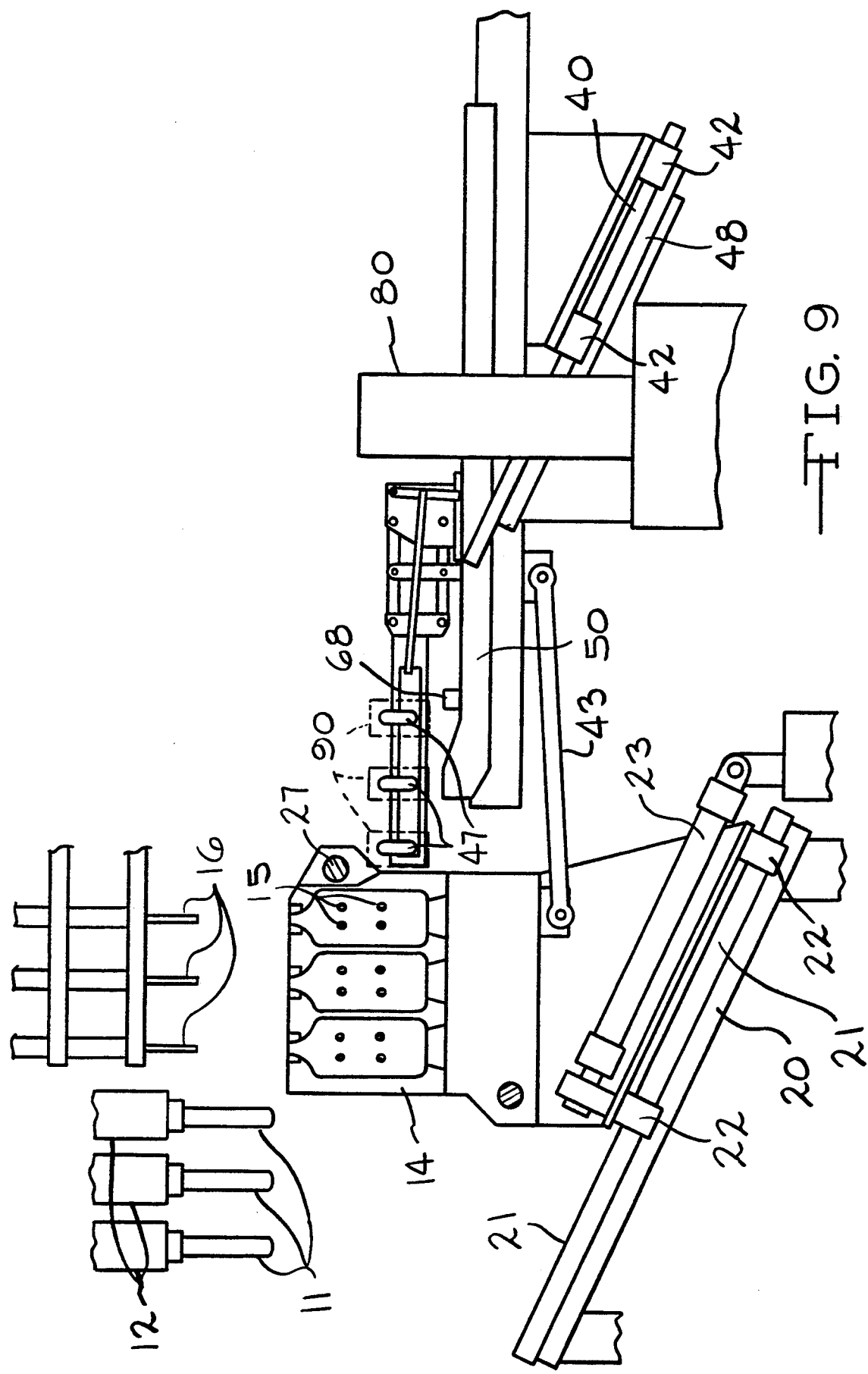
Figure 14:
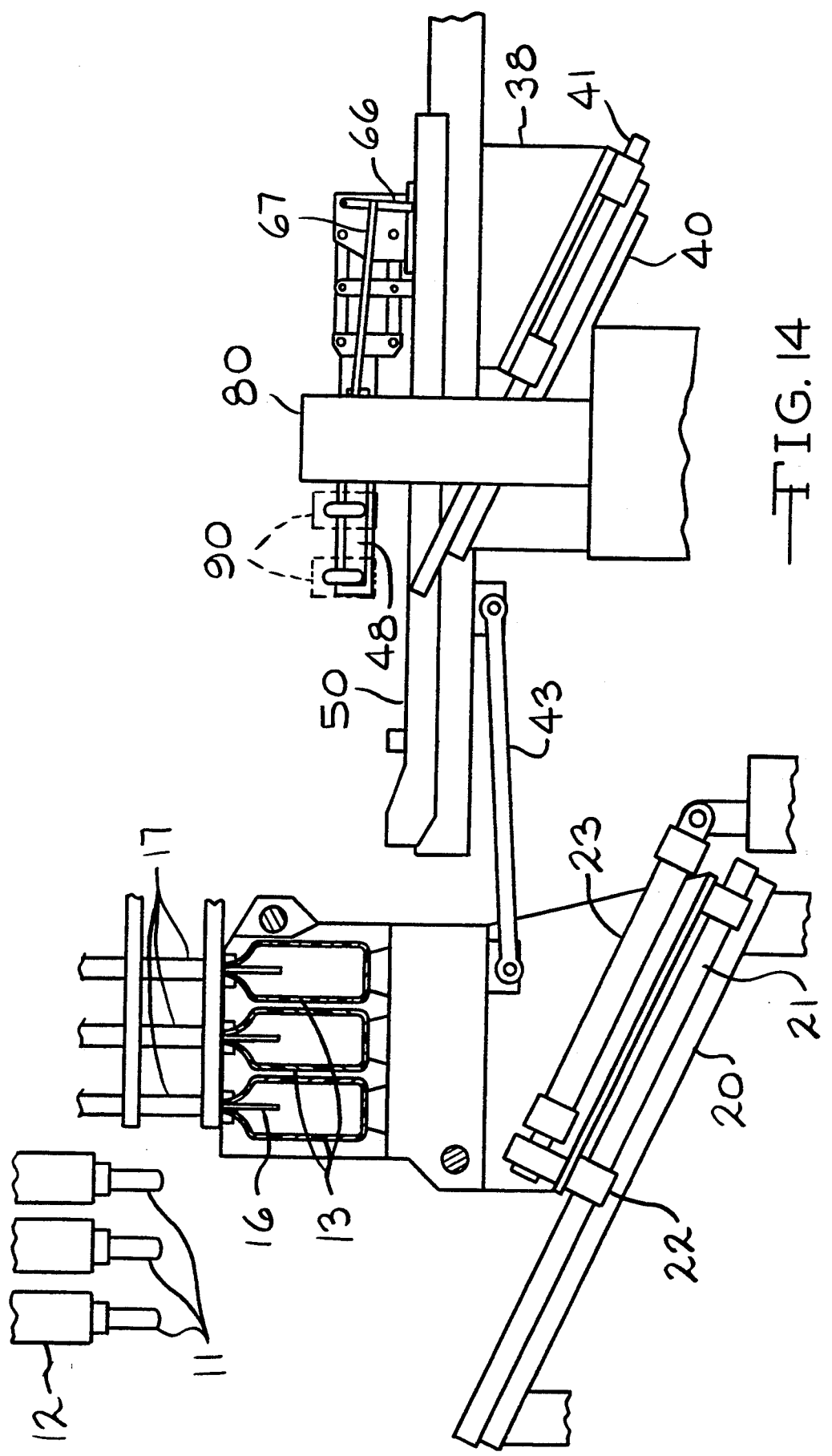

FIG. 15 shows the mold and inserter of FIG. 14 with the containers removed from the open mold and the inserter advanced and waiting with labels on its extension arms ready for insertion in between mold halves as in FIG. 9; and FIG. 16 is a schematic view of the inserter showing its carriage and its insert arms extending fully between the opener mold halves and illustrating typical electrical cable connections from the computer to the carriage and its drive as well as listing the typical functions controlled by the computer.

DETAILED DESCRIPTION

Figure 1:
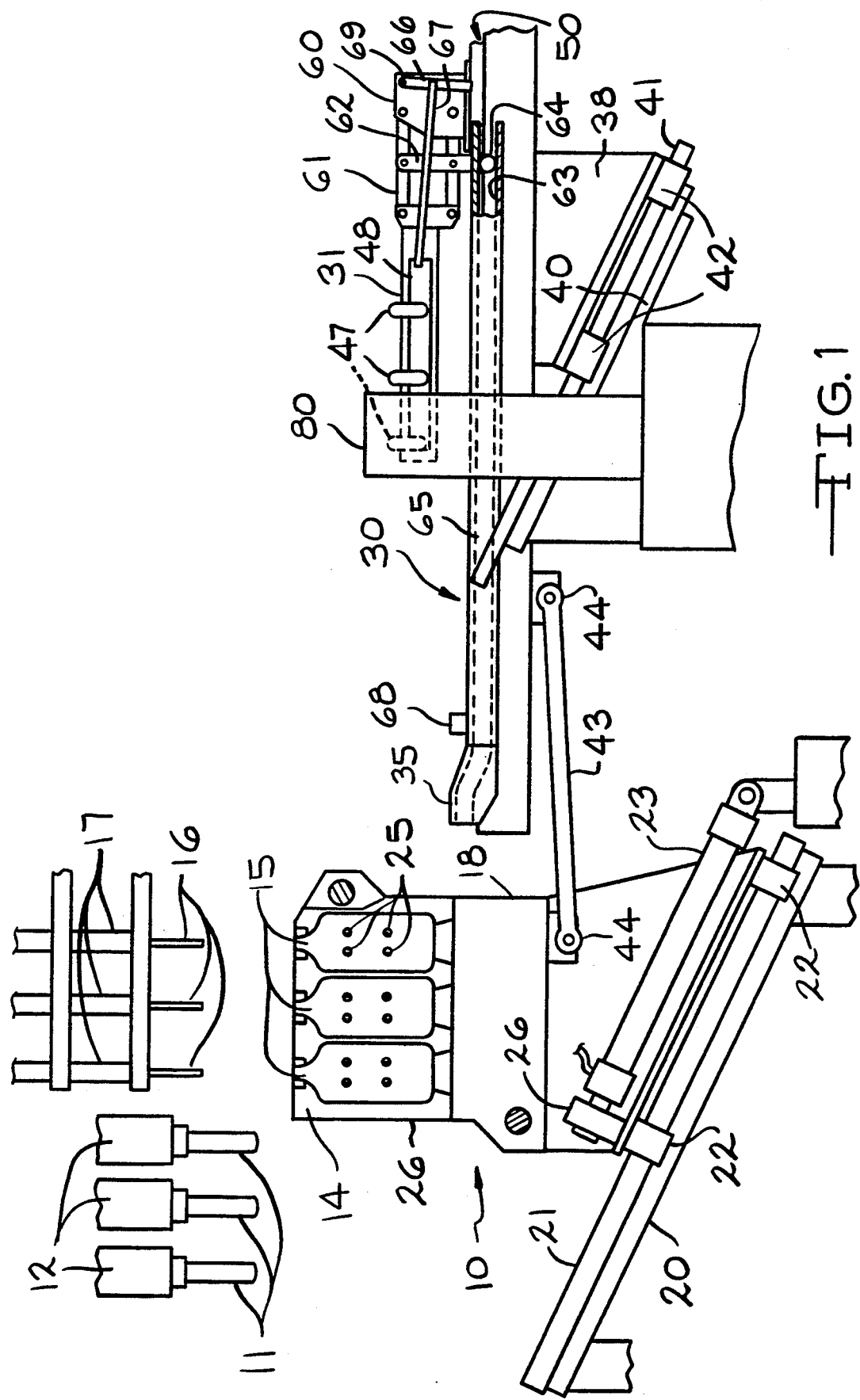
FIG. 1 is a schematic cross sectional side elevation view of a label inserting apparatus in one of three pickup stations for cavities of a three cavity mold of a shuttle machine for making containers of resin material.

Referring to the drawings in greater detail FIG. 1 shows somewhat schematically a multiple cavity in-mold resin molding machine 10 in which the mold 14 supported on a base 18 is slideably mounted for movement to and from alignment with extruder heads 12 by way of bearings 22 on a pair of support rods 21 on opposite sides of an inclined support bed 20. A label inserter 30 on a base 38 is similarly slideably mounted by way of bearings 42 on a pair of parallel support rods 41 on opposite sides of an inclined bed 40. The mold 14 is moveable up and down the inclined bed 20 under power supplied by a hydraulic piston and cylinder drive 23. The inclined beds 20 and 40, and slide rods 21 and 41 respectively, are inclined equal degrees to the horizontal, for example between 20 and 30 degrees and both are shown having nominally a 25 degree angle to horizontal so that the paths of travel of the mold 14 and the inserter 30 are parallel. A connecting bar 43 having universal ball type joints 44 at opposite ends ties the inserter permanently to the mold support 18 whereby they move in tandem in fixed physical spatial relation. That is, any movement of the mold 14 up and down along the inclined bed 20 results in the inserter 30 being moved parallelly in unison therewith along its inclined support bed 40. Thus, the drive for movement of the mold along the path to and from the extruder heads 12 is also the drive for moving the inserter.

The mold 14 is shown having three cavities 15 for formation of containers therein. Three parisons 11 are supplied from the extruder heads 12 spaced to supply the cavities 15 when the mold 14 is brought up into alignment under the extruders 12 and the parisohs 11 fed therefrom. Because of the permanent connection of the tie bar 43, the inserter 30 is drawn upwardly with the mold in parallel relation along its inclined bed 40. After receipt of a predetermined length of parison in each of the cavities 15, the mold 14 is closed and then moved downwardly and laterally away from the extruders 12 into alignment with three blowers 17 which are thereupon lowered for insertion of the blower pins or nozzles 16 into the necks of the cavities for blowing of the resin therein into conformity with the cavities whereupon the blowers are lifted with the containers 13 and the nozzles withdrawn to release the containers.

The inserter 30 includes a longitudinal insert beam 31 projecting forward in horizontal cantilevered fashion from the carriage 60 supported on a linear drive motor 50 which provides a horizontal track over which the carriage can travel toward and away from the mold 15. Thus the carriage 60 and the insert beam 31 thereon travel in a direction transverse to the direction of the inclined parallel paths of the mold and the inserter 30. The linear drive motor 50 is mounted on its base 38 also in cantilever fashion which facilitates its coordinated movement with the mold 14 in a path adjacent the label supply magazines 80 located on opposite sides of the linear drive 50.

A pair of label holders 47 for label transfer association with each pair of mold halves are aligned on opposite sides of the beam 31 with each adjacent pair of holders 47 being spaced a distance from each other matching the spacing between adjacent mold cavities 15. The holders 47 are actuated by a yoke 48 connected by a bar 67 to an actuating arm 66 which is triggered upon forward movement of the carriage 60 on the linear drive 50 to a position where the arm 66 makes triggering engagement with an adjustably positionable stop 68. This engagement imparts a pull on the connecting bar 67 and the yoke 48 to which it is connected thereby causing the label holders 47 to swing outwardly from both sides of the beam 31.

The carriage 60 includes a support frame 61 for the beam 31. The support frame is pivoted at its base so that the beam 31 can be lifted in its horizontal orientation by a lift arm 62 having a cam follower 64 at its lower end. As the carriage is advanced by the linear drive 50, the cam follower 64 follows a channel or cam groove 63 in a side bar 65. At the forward end of the linear drive structure the groove 63 rises as shown in dotted lines. Therefore as the carriage reaches the forward region toward the mold 14, the beam 31 is lifted on the carriage 60 by the lift arm 62 and its cam follower 64 which follows the rise in the cam groove 63. This enables movement of the label holders 47 and labels 90 carried thereby into predetermined positions between the mold cavities 15 when labels are to be placed in preselected hard to reach locations within the cavities 15. The cam groove 63 can be extended into an attached end of the inserter 30 thereby permitting the end to be replaced with a straight grooved attachment or any of a number of other contoured groove attachments with grooves different shapes, inclined up or down, to cause desired up or down movement of the horizontal beam 31 in its path to and from the mold 14.

Although the invention as herein shown and described in relation to a single mold 14 with three cavities 15, or in other words in relation to a pair of mold halves into which labels are inserted, in practice the mold might have only one or might have a number of side-by-side product cavities such for example as two, three or four into which labels 90 are to be inserted, usually simultaneously. The number of label holders 47 required thus correspond to the number of cavities into which the labels must be inserted. A corresponding number of label magazines 80 for supply of labels 90 to each label carrier holder 47 can be provided for simultaneous pick up of labels by the carriers. In practice, however, because space is usually at a premium in production facilities, only a single pair of label supply magazines 80 is usually provided on opposite sides of the path of movement of the label carrier. Each of the label magazines 80 can be adjusted in position vertically by adjustment bolts 85 shown in FIG. 4 while lateral adjustment in position and the adjustment for in and out position relative to the beam 31 is accomplished by screw adjustments 81 and 82 respectively.

In such an arrangement, the label carriage is programmed to advance and to stop for the holders 47 to extend laterally to pick up a pair of labels 90, a number of times corresponding to the number of pairs of mated mold cavities 15 to which labels are to be laterally transferred. More specifically, if as shown herein, three sets of mold cavities 15 are to be supplied with labels 90, the carriage is programmed to make three successive stops in its advance to the mold 14, to pick up a pair of labels 90 from the single pair of label magazines 80. After pick up of the full complement of labels, the carriage is preferably moved forward to a position just outside the mold where it is stopped ready for quick movement of the insert beam 31 between the mold halves when they are opened to supply labels 90 to the mold cavities 15.

As can be seen in FIGS. 6, 7 and 8, the suction cups each have a longitudinal shape to facilitate stable holding of large labels thereon with little tendency to turn and thereby to better assure proper alignment of an inserted label in its respective mold cavity 15. Each suction cup 75 with its major dimension oriented generally vertically is mounted on a finger member 76 which has a lower horizontal pivot 77. The finger member 76 is biased forwardly by a leaf spring 78 pressing near the top of its back side to push the suction cup thereon forwardly for application of a label held thereon onto the wall of a mold cavity thus facilitating conformance of a label 90 and the suction cup 75 to the contours of a mold cavity. The finger member 76 is supported on a base member 77 which in turn is supported in vertically pivoted relation at the free end of a laterally swingable cantilevered extension arm 71. The extension arm 71 is mounted in vertically pivoted relation at the side an arm 32 of the insert beam 31. Thus the label holding suction cup 75 on its respective finger member 76 can be swung outwardly from the insert beam on the cantilevered extension arm 71.

An additional connecting guide member 79 for construct orientation of the suction cup 75 as it moves outwardly from the insert beam 31 is associated with the cantilever extension arm. The guide member is mounted in offset adjacent relation to the extension arm 71 with a vertical pivot at each end next to an end of the cantilever extension arm 71. In other words the offset connecting member 79 has a vertical pivot at one end connected to the base 77 for the suction cup finger 76 and a vertical pivot at its opposite end connected to a pivot mount 84 immediately adjacent the pivot for the cantilever extension arm 71. By this arrangement, upon outward swinging movement of the cantilever extension arm 71, the suction cup 75 and its supporting finger 76 are oriented constantly in outwardly facing relation at right angles to the side of the insert beam throughout the outward swing of the cantilever extension arm 71.

As indicated above, the finger 76 is backed by a leaf spring 78 which acts to push the top end of the finger 76 and the suction cup 75 thereon laterally outward generally at a right angle to the insert beam 31. This facilitates transfer of a label 90 on the suction cup to the interior wall of the mold cavity by providing the suction cup with a predetermined amount of give upon contact of a label with the interior wall of a mold cavity 15.

The vertically pivoted extension arm 71 holding the finger 76 can be swung laterally outward about its pivot 74, at the side of the insert beam 31. In its normal position the extension arm 71 resides in close adjacent relation with the side of the arm 32 or 33 of the insertion beam 31. The extension arm 71 is swung outwardly from this close association for example with the insertion beam 31 by the pivoted yoke 48 which acts as a lever member connected in offset relation with the cantilever extension arm 71 so that upon exertion of a pull force rearwardly toward the base of the yoke 48, the extension arm 71 swings outwardly such as when it transfers a label on the suction cup to the interior of a mold cavity 15, or when a label is to be picked from the label carrying magazine 80 when the beam is withdrawn to a retracted position where the suction cup is aligned adjacent the magazine.

When the mold has multiple cavities as indicated above, a number of label carrying extension arms 71 corresponding to the number of cavities in the mold are provided. For example, if three sets of mold cavities 15 are to be supplied with labels 90 as shown in FIGS. 5 and 6, three label carrying extension arms 71 are provided on each insert arm 32 and 33, respectively, at opposite sides of the insertion beam 31 for provision of labels to each cavity of both halves of the mold.

The three extension arms 71 on each side of the beam 31 are connected by the yoke 48 which connects with each extension arm 71 in offset vertically pivoted relation near the side of the insertion beam 31 in a manner such that when a pull force is exerted to draw the yoke rearwardly toward the base 34 of the insertion beam, all three label carrying extension arms 71 swing outwardly in unison to bring the labels carried by their suction cups 75 into communication with the wall of their respective mold cavities. After supply of labels to the cavity of each mold half, the negative pressure to the suction cups 75 is arranged to be shut off thereby releasing the labels therein. Conventional suction means is associated with the interior surfaces of each mold half in the form of spots of porous material 25 (FIG. 1) to which a negative pressure is applied to hold the labels in position within the mold halves. The programming of both the linear electric drive system and the electro-pneumatic label holding system is accomplished by a conventional computer arranged to act as a controller which supplys programmed digital control signals to both systems.

When labels 90 are to be supplied only to cavities on one side of the mold, only the label carrying extension arms on the corresponding insert arm of the projection beam are actuated by application of force on their connecting yoke 48 whereas if labels are to be provided from both sides of the insertion beam, the yokes 48 on both sides of the beam 31 are actuated simultaneously to supply labels to both halves of each mold cavity.

The laterally moveable extension arms 71 on both sides of the insert beam 31 are actuated by connecting each of the yokes 48, FIG. 5, on both sides of the projection beam 31 to separate connecting tie bars 67 which extend back for connection with generally vertically aligned, horizontally pivoted rocker arms 66. The connecting bars 67 are located on both sides of the carriage and extend to corresponding yokes 48 on opposite sides of the insert beam 31. Each of the tie bars 67 at their other end are interconnected through a common shaft 69 so that the rocker arms 66 on both sides of the carriage 60 move in unison. Thus when the rocker arms on either side of the carriage are moved, such as by being brought into contact with a fixed limit stop 68, the label carrying extension members 71 on both sides of the insert beam 31 swing laterally outwardly as shown in dotted lines on one side in FIG. 5. The extension members 71 are moved outwardly either for communication with and acceptance of a label from a magazine 80 or for placement of a label 90 on the interior wall of a mold cavity 15 which it faces. Upon withdrawal of the carriage 60 and corresponding withdrawal of the rocker arm 66 from engagement with the limit stop 68, a tension spring (72) connected to the rocker arm assembly acts to return the extension arms 71 to their normal resident position in close adjacency with the side of the respective insert arms 31 and 32 on which they are mounted.

Figure 2:
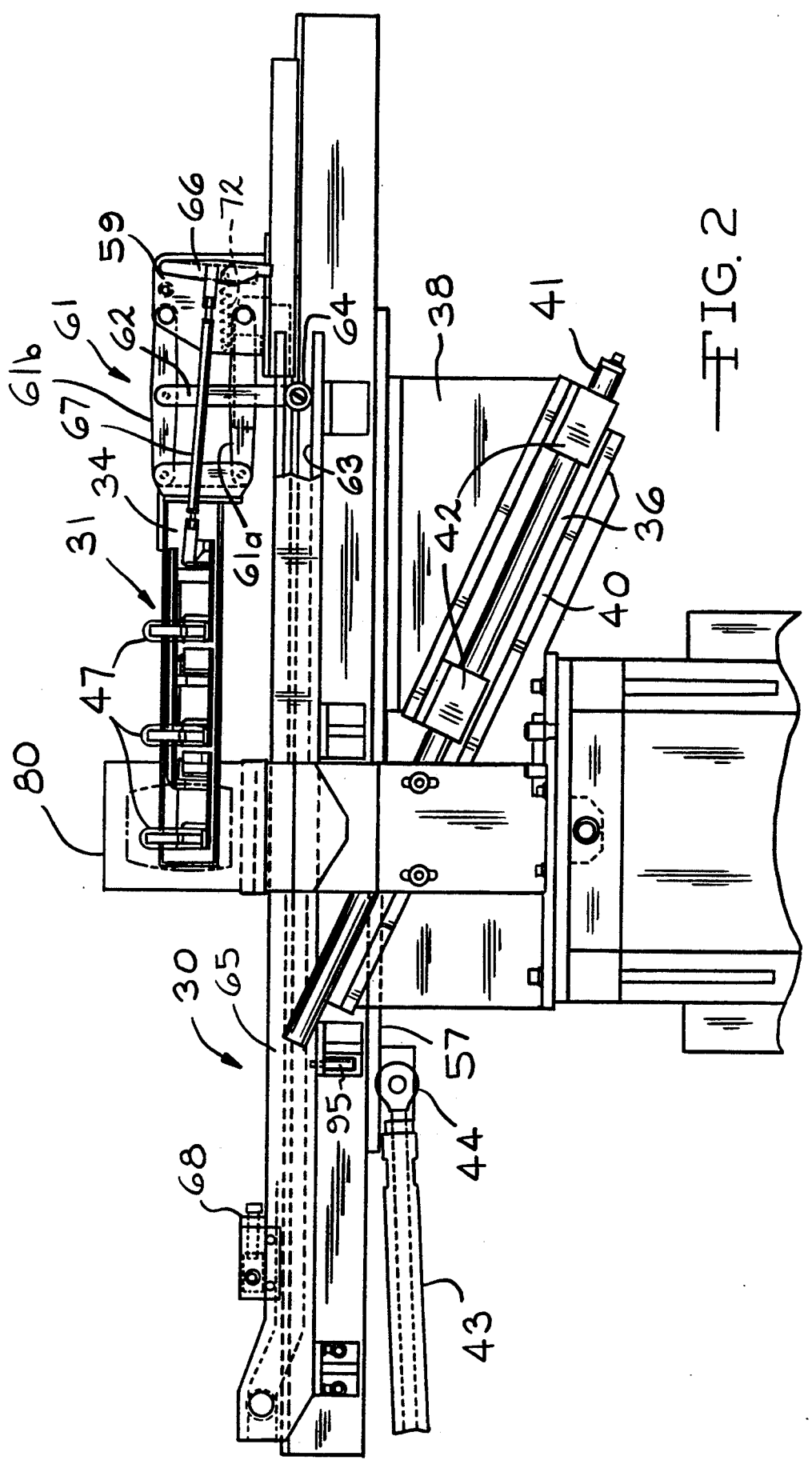
FIG. 2 is a side elevational view in detail of the label inserting apparatus shown in FIG. 1.

As can be seen in FIGS. 2 and 3 the insertion beam is made up of two parallel forwardly projecting insert arms 32 and 33 spaced apart a distance adequate to accommodate between them the parisons 11 as they flow downwardly from the extruders 12. The insert arms 32 and 33 are joined or bridged at a base 34 which is supported by a support frame 61 with upper and lower portions 61a and 61b parallelly oriented and connected to a vertical mounting frame 59 on which they are horizontally pivoted. By this arrangement, the insert beam 31 can be raised and lowered in its horizontally projecting relation for insertion between the mold halves and about the parisons 11 of the product molding machine. The raising and lowering of the insertion beam 31 is accomplished by providing the vertical lift arm 62 with a horizontal pivot connection 58 to both the upper and lower lift frames 61a and 61b in a region generally between the frame connection to the base 34 of the insertion beam 31 and the mounting frame 59 on the carriage 31.

The lift arm 62 projects downwardly from the lower lift frame 61a and has an end at which two side-by-side cam follower rolls 64a and 64b are mounted, one of which (64b) rides on a lower level track and the other of which (64a) projects laterally outwardly therefrom rides in the groove 63 in the side bar 65 which in a sense provides both a lower level track and an upper level track parallel to the distributed power track 49 (FIG. 4) for the linear drive 50 on which the label carriage 31 rides. Thus as the carriage moves back and forth on the track 49, the vertical position of the insert beam 31 is governed principally by the position of the cam follower roll 64a in the side bar groove 63. If the Side bar groove 63 is provided with a rise from a horizontal path, the lift bar 62 is correspondingly raised, and both the lower and upper beam support frames 61a and 61b respectively are correspondingly raised to lift the insert beam 31 to the degree desired as determined by the contouring of the groove 63 in the side bar 65. It will be understood that any number of contoured paths can be provided in the side groove 63 to either lower or raise the insert beam 31 in its horizontal projecting orientation. A feature of the arrangement is that as the cantilevered insert beam 31 is raised and lowered on the carriage 60 it is maintained in its horizontal orientation in all locations along its path of movement, thus assuring a constant relation with the open mold halves when labels 90 are being supplied thereto.

The mold cavities 15 conventionally are each provided with spaced small masked openings 25 at which a negative pressure is provided by connection of the mold half to a negative pressure source. By this means when a label 90 is inserted in the cavity, the spaced negative pressure spots 25 act to receive the label from a label carrying finger 76 and to hold the label 90 against the interior wall of the cavity upon shut off of the negative pressure at the suction cups. The label holding finger 76 is thereupon withdrawn from the cavity region of the mold 14 coincident with withdrawal of the insert arm 31 from the cavity region. In the present arrangement a negative pressure is established in a manifold to which the marked zones in the mold cavities as well as the suction cups are connected. The manifold is a conventional pressurized air flow manifold which generates a negative pressure which is extended to each of the suction cups 75 by way of connecting suction tubes 92 as represented in FIG. 7.

The linear drive motor 50 is mounted on a longitudinal horizontal support plate 57 which in turn is supported on the moveable support base 38. The plate 57 extends forward in cantilever fashion for at least half its length from the moveable base 38 on the bed 40 and projects between the two slide rods 41 on which the moveable base is mounted. The support [late 57 also acts as a means for joining the connecting bar 43 to the inserter to permit pulling the inserter up the inclined rods 41. The connecting bar 43 extends between the support plate 57 for the linear motor and platen 26 for the outside mold half. This connecting bar with a freely moveable ball and socket joint 44 at each end is arranged so that as the outside mold platen 26 moves in and out during closing and opening of its mold half, no interference from the connecting bar 43 occurs. At the support plate 57 for the linear motor 50 to which the connecting bar 43 is joined a stud engages a threaded opening in the side of a connecting block mounted in underlying relation with the forward portion of the support plate 57. At the opposite end of the connecting bar 43, the ball and socket joint is provided with a stud which is fixed in a block mounted on the outermost platen of the mold support platens 26.

Each of the spaced parallel slide rods 41 on which the moveable base 38 for the inserter 31 is mounted is in turn mounted on a longitudinal spacer member 36 underlying the rod 41. The bearings 42 for the moveable support base 38 mounted in overlying relation thereon thus can encompass the sides and the freely open portion of the rods 41 to reduce the sliding friction of the moveable base 38 over the length of the support rods 41.

THE LINEAR MOTOR AND ITS CONTROL

The linear motor is a brushless linear servo motor having an inverted generally "U" shaped armature 52 overhanging a vertical relatively thin central weblike magnet stator member 51 with insert permanent magnets projecting upwardly for the full length of the motor 50. The armature 52 is a longitudinal inverted "U" shaped member of relatively short length having, for example without intention to be limited thereto, a length in the order of 10 to 12 inches, while the stator is made as long as the path over which the armature which drives the carriage is to travel, for example a length of five feet.

The linear drive motor used and illustrated is of the type disclosed in detail in U.S. Pat. No. 4,839,543 entitled Linear Motor although other types of linearly distributed drives may be adaptable to the invention.

Flat permanent magnets (not shown) are present in the web in side-by-side spaced and alternating polarity relation. A pair of upwardly projecting side walls 54 spaced on opposite sides of the stator 51 also extend for the full length of the motor. The label carriage 60 including the motor armature 52 is supported on the upper edge of the two side walls of the linear drive motor stator 51. Each side wall 54 provides a track at the top thereof running the full length of the linear motor and has a groove in its side which is engaged by bearings on the carriage. Longitudinal bearings for support of the carriage 60 are mounted on each side of the carriage and make engagement with the outside bearing grooves in the tracks supported on the side walls 54 of the linear motor.

The label carriage supports and is driven by the inverted "U" shaped armature 52 thereunder which has a series of side-by-side multi pole flat coil assemblies on each side leg of the "U" extending along the length of the armature. Each series of coils is arranged to extend down between the central web and a side wall 54 to generate an EMF which reacts with the flux of the permanent magnets in the central web to move the armature under control forward and back along the length of the motor.

The linear drive has an optical encoder gauge located at its side extending over the length of the drive 50 over which control is exercised. The gauge is a glass or transparent scale of other material (not shown) with side-by-side graduations or markings, for example four microns wide, which act with a light source as to provide indexing signals in the form of narrow light and dark regions sensed by a photosensor pulse signal generator which indicate the incremental position of the carriage as it travels over the linear drive. The pulse signals are supplied to a read only memory (ROM) for counting. The readings are matched against a program for producing preselected desired results. For example, 96,000 graduations can be provided in the scale, each designated with a position code, and the carriage can be programmed to start from any position and moved to any other as dictated by the program. Each position is assigned a code number and the inserter 30 is accordingly programmed to carry through its assigned function precisely in any position selected based upon a feedback signal in the form of a count of pulses from the beginning position and within the time selected.

The linear motor 30 is capable of being controlled by programmable logic controls of the computer including a closed loop digital servo controller such as is sold commercially as a Smart Motion Controller Card available from Baldox Motion Products Group, Fort Smith, Arkansas, which card circuit controls power and the time within which the armature is to move from one position to another. That is, there are a number of acceleration rates that can be set at the controller within a range of accelerations possible with the given linear motor. When an acceleration rate setting is selected, the armature moves at that rate up to a speed determined by the computer as required to get from one position to another within the time selected. In other words, the acceleration is set and the time for movement from one position to another is set into the computer and the computer by programming then determines the speed required to get to the desired position in the given time and the acceleration setting.

The armature 52 and the carriage 60 driven thereby are locked into position at each stopping position and the profile of movement between each stopping point along the way is determined by the computer. By way of example, if desired the armature can be moved slowly by setting a slow acceleration rate and a long period for movement from one position to the other.

Although the linear drive shown and described herein is a linear electric motor which is preferred, other linear drive means might also be utilized in place thereof. For example, linear electric motor drives incorporate either a stationary stator or coil assembly, and accordingly either a moving armature or magnet. They have the advantage of high efficiency since the linear motion is induced solely by electromagnetic force. As indicated the preferred embodiment employs a linear electric servo motor of the moving coil type, but linear electric stepper motors (with or without an encoder) may also be employed. Alternatively, less efficiently, the linear drive may take the form of a rotary servo motor or stepper motor combined with a rotary-to-linear conversion mechanism.

Further although pulse signals sent to the controls are herein described as generated by preferred electro optical means, magnetic, mechanical or pneumatic pulsing converted to electrical signals might in some instances be substituted for supply to the computer for control.

LIMIT SWITCH ARRANGEMENT

The armature 52 and the carriage 60 which it drives are moveable forward to the mold and to the rear end of the central stator 51 to a rear electrical limit mark formed by an aperture 86a in a limit bar 96 (FIG. 16) located at the rear end and on one side wall 54 of the stator at which point the computer control is programmed to shut off the energy to the armature and lock the armature 52 into a stopped position. Two such limit apertures 86a and 86b (FIG. 16) are provided in the limit bar 96, one spaced to the rear of the first as a safety stop if the carriage because of its mass or other reason should overshoot the first. If however the power should for some extraneous reason be shut off as the armature is moving rearwardly and the mass of the carriage is such that it carrys the carriage beyond the rear electrical limits 86a and 86b, a mechanical bumper stop 87 is provided just to the rear of the electrical limits to provide still a third limit stop for the carriage should it in fact overrun its programmed electrical limits.

The limit aperture 86A can be used as a reference or zero position point for the stator which the linear drive 50 can use as a starting point. That is, should the carriage 31 travel beyond the rear electrical limit 86A and pass to the limit aperture 86B or the bumper stop 87, a number of negative position pulses would be supplied to the computer to indicate the exact location of the stator at any such point beyond the zero at the aperture 86A whereupon a computer feed back signal is provided to the stator to advance it to the zero point 86A for the start-up position for any subsequent cycle of operation in relation to the blow mold equipment with which it is associated. Similar limit apertures are provided at the opposite end of the side wall 54 defining the length of travel of the armature.

In this regard a similar limit bar arrangement (not shown) with a pair of apertures one behind the other at the front end of the drive 50 is provided as a safety stop if the carriage for some extraneous reason should travel beyond its required position in supply of labels to the mold recesses. A mechanical shock absorbing type bumper is similarly positioned beyond this limit bar arrangement in case of failure of the electrical limit stops. That is, the carriage will be driven to its position for supply of labels to the mold recesses but if it should for some unknown reason move beyond this performance position, the first electrical aperture in the series of two would act to stop the stator and the second would act as a backup therefore. But in the event of electrical failure, the mechanical bumper at the extreme tolerable end would act to halt the stator's motion. In all three instances, the computer would receive information as to the position of the stator as indicated by the encoder position signal. Thus the stator over travel can be sensed at either end, and the computer can be arranged to return the carriage to a zero position or what might be termed a home position for starting a new cycle.

As an independent limit arrangement separate from control through the computer, the closure of the molds in the mold machine can be halted in the event the beam is located in between the mold halves as they are ready and about to be closed. This is accomplished by providing a proximity switch 95 located on the side wall of the beam 30 which is interconnected with the mold machine drive circuit for closing the mold halves so that the mold will not be able to close onto the beam 31 extending in between the mold halves. In other words the presence of the beam 31 in between the mold halves acts through the proximity switch to hold the power circuit open for the mold drive so that the mold halves are unable to close or so that the circuit is otherwise unable to act while the beam is in a position between the mold halves when it should not be there.

Another limit switch (not shown) is provided on the molding machine which acts to prevent movement of the mold halves on their support from a lower position to an upper position until the mold halves are fully open. The signal in the mold machine which prevents the movement of the molds until they are fully opened is correspondingly used to indicate to the computer that the carriage should not be advanced until the mold halves are fully open. Thus the carriage and the mold machine work in concert to assure that the carriage and the beam 31 are not advanced prematurely.

OPERATIONAL SEQUENCE

Turning more specifically to the co-operational cycles of the inserter 30 and the molding machine 10 throughout the molding operation illustrated in FIGS. 1 and 9 to 15 for production of in-mold labeled containers, FIG. 1 illustrates the inserter 30 in one of three pickup stations for receipt of labels to be inserted in cavities 15 of the three cavity mold 14 of the molding equipment 10. Label holders 47 are aligned on both sides of the beam 70 so that each time the carriage 60 is stopper as in FIG. 1, all holders 47 are extended outwardly but only a pair of oppositely disposed holders 49 are in a position to pick labels from the two label magazines 80 on opposite sides of the inserter.

FIG. 9 illustrates the carriage 60 advanced from its position in FIG. 1 with a full complement of labels 90 on its holders 49 to a position adjacent the mold 14.

Figure 10:
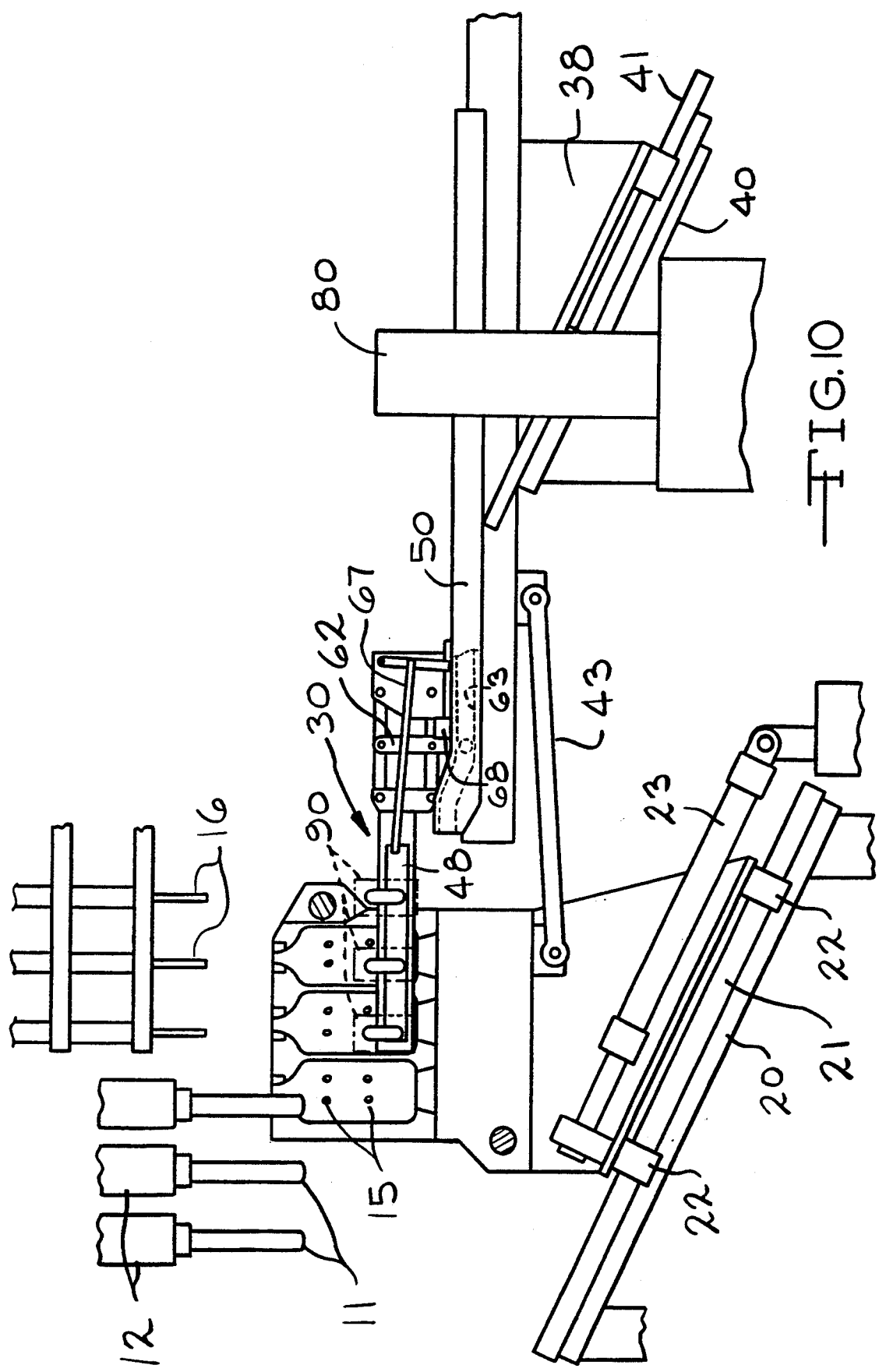

FIG. 10 illustrates the mold 14 having been advanced laterally and upward along the inclined support rods 21 from its position in FIG. 1. The inserter 30 correspondingly has been pulled laterally and upwardly along its inclined path by the support rods 41. While this lateral motion of the mold 14 and the inserter 30 occurs, the carriage 60 is advanced to where the beam 31 with labels 90 is partially inserted between the open halves of the mold 14.

Figure 11:
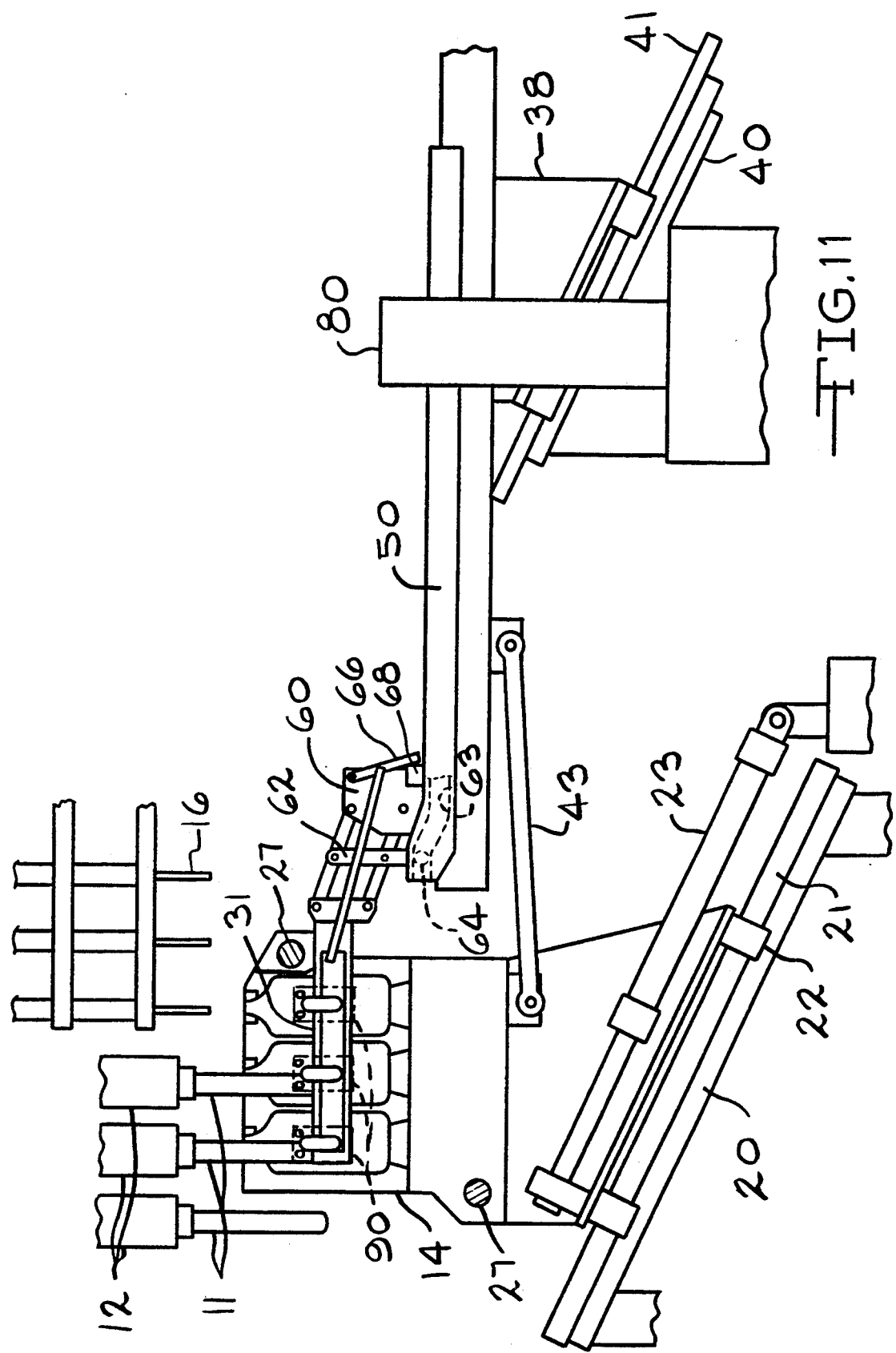

FIG. 11 illustrates the carriage 60 having been advanced from its position in FIG. 10 in a direction transverse to the parallel paths of the mold and inserter with the beam 31 fully inserted between the halves of the mold 14 and with the beam lifted by the arm 62 by its cam follower roll 64 following the contours of the cam groove 63. The mold 14 although somewhat advanced in its upward path along the inclined bed 20 from its position in FIG. 10 still is not in full alignment with the parisons 11 under the parison extruder heads 12 when the labels 90 are inserted in the mold cavities by triggering of the actuating arm 66 in its engagement with the stop 68 as the carriage 60 moves forward. That is, the labels 90 on the insert beam arms 32 and 33 are brought in between the mold halves on opposite sides of the parisons 11 for insertion of the labels 90 in the mold cavities 15 and the beam 31 begins while the mold is still moving laterally into alignment with the parisons. During this procedure the labels 90 are inserted with a swinging action into the recesses of both mold halves on opposite sides of the parisons 11. The labels 90 are pressed into the mold recesses 15 by the label holders 47 and held there for a fraction of a second time (for example 0.2 seconds) adequate to allow the force of negative pressure at the mashed openings 25 to take hold of a label 10 placed therein before the holders 47 begin to be withdrawn from the recesses. The insert beam 31 in having been lifted up into the region between the mold halves reaches under and upwardly around the upper support rod 27 for the outer platen 26 for the matched mold cavities, thereby avoiding the obstruction presented by the support rod 27.

Figure 12:
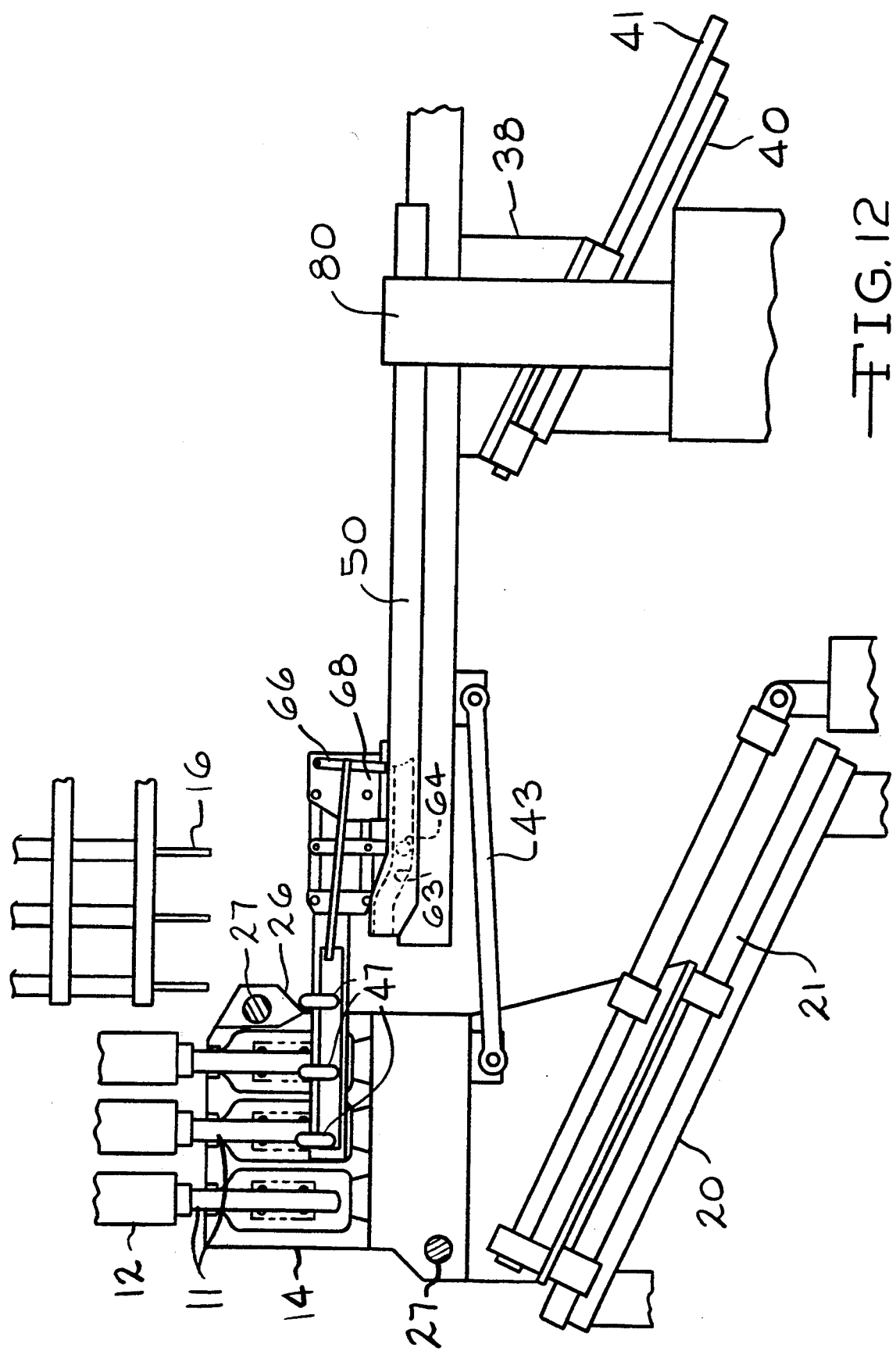

FIG. 12 shows the mold 14 fully advanced laterally up the bed 20 into alignment under the extruders 12 and the parisons 11 with the carriage 60 and insert beam 31 partially withdrawn from between the mold halves and the trigger arm 66 returned to its normal position and the label holders 47 already moved into their recessed association with the side of the beam 31 to assure clearance for the beam withdrawal. In the process of withdrawal of the carriage 60 and the insert beam 31 the beam 31 as shown has been lowered by reason of its lift arm 62 having been moved to a position where its cam follower roll 64 is located in the lower portion of the cam groove 63.

Figure 13:
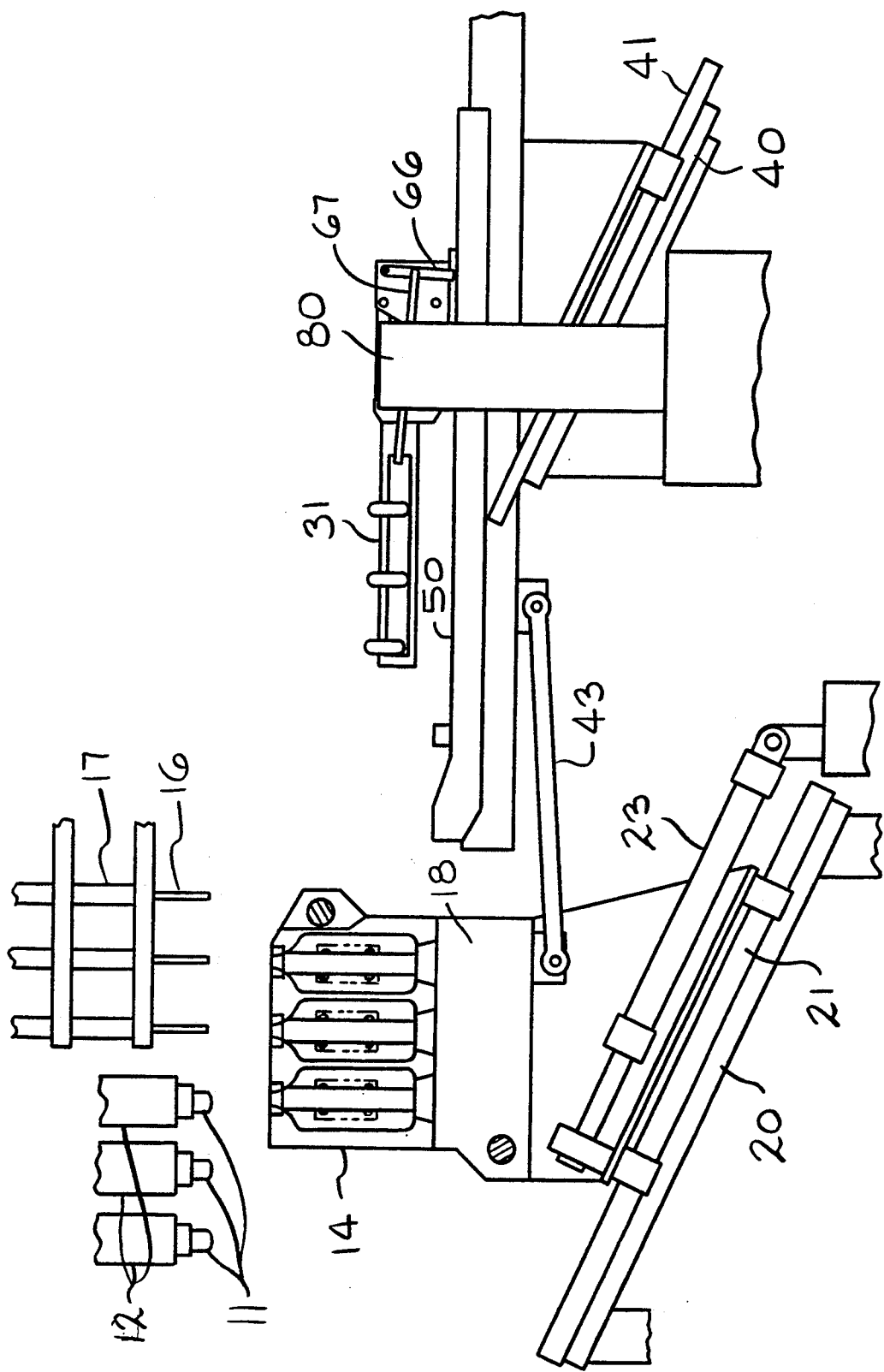

FIG. 13 illustrates the position of the mold 14 after having been cut from the parisons with parison portions contained therein on which the mold halves have closed. The mold 14 in this position has been moved downwardly as well as laterally part way along its path of travel on the bed 20 away from under the extruders 12. Portions of the parisons 11 are disposed alongside the labels 90 held in the mold cavities ready for blowing of the parisons upon insertion of the blower nozzles 16. Meanwhile the carriage 60 with the lowered beam 31 is further retracted on the inserter 30 from its more advanced position illustrated in FIG. 12.

In FIG. 14 the mold cavities 15 are brought laterally away from under the parisons and fully to the lower level on the bed 20 directly under the blower nozzles 16 shown inserted in the necks of the containers to form the containers 13 in the mold cavities 15. Meanwhile the inserter 30 is advanced in the process to a position for picking a third pair of labels 90 from the label magazines 80 on opposite sides of the inserter.

FIG. 15 shows the newly blown container 13 lifted from the open mold 14 while the carriage 60 with three pairs of labels 90 held by holders 47 on the beam 31 have already advanced to a wait position for a signal from the mold 14 to indicate that it is now open, ready for labels 90 to be inserted in their respective mold cavities 15.

Thus the cycle of operation of the mold machine 10 and the cycle of operation of the inserter 30 function separately but interdependently in unison based upon the product production cycle of the machine 10 in relation to its parison supply station and the container blowing and removal station.

If for some extraneous reason the label carriage is advanced too far between the mold halves, that is beyond their label applying region, the triggering extension arm 66 passes over the stationary bumper stop 68 and all the extension arms 74, respond in unison by returning to their normal retracted positions at the side of the insertion beam 31 out of potential danger of contact with the mold halves. The label carriage is programmed through the computer to thereupon simultaneously move quickly to a position where the beam 31 is outside of the space between the mold halves.

FIG. 16 is a schematic illustration of the inserter 30 with the carriage 60 and its insert arms 32 and 33 fully inserted between the two halves of the mold 14 and on opposite sides of the downwardly flowing semi-fluid parisons 11. The electro-pneumatic valve control cable 99 extends between the computer 100 and the carriage 60 while the linear drive and limit switch cable 99 extends between the linear drive 50 and the computer.

As listed in FIG. 16 the computer controls the linear drive (a) carriage positions, (b) carriage acceleration and speed, and (c) carriage timing and power. In addition the computer 100 provides control over limit switches to (d) brake over travel of the carriage to the rear, (e) a proximity sensor switch such as a magnetic field sensing switch connected into the mold electric power circuit to prevent closure of the mold halves while the beam 31 is still in a position therebetween, and (f) prevention of advance of the carriage 60 and insertion of the beam 31 into the mold before the mold halves open. Further the electro-pneumatic valve settings for the (g) suction cups and (h) suction at the mold cavities are controlled over cable 98 which extends between the computer and the carriage 60.

Although the invention as herein described in relation to production of hollow plastic products such as a detergent or beverage bottles, it will be understood that the principles of applying a label in the molding process is applicable as well to the manufacture of solid plastic products in such a molding operation.

In view of the foregoing it will be understood that many variations of the arrangement of my invention can be provided within the broad scope of principles embodied therein. Thus, while a particular preferred embodiment of my invention has been shown and described, it is intended by the appended claims to cover all such modifications which fall within the true spirit and scope of the invention.

We claim:

1. A label inserter for supplying labels to a mold of a blow-molding machine for production of in-mold labelled synthetic resin products wherein mold halves having recesses defining a blow mold cavity receive at least one inserted label therein and are closed about a resin parisan which is then blown to form a labelled product conforming to the mold cavity shape and then opened to release the labelled product, said mold halves being located on a moveable supporting base, said label inserter comprising a label supply means;

a carriage carrying at least one label holder for removing a label from the label supply means and delivering the label to the mold, said carriage being arranged for movement longitudinally along a path for insertion of labels in said mold halves, a moveable linear support for said carriage on which said carriage can be advanced toward and retracted from said mold, said moveable linear support extending along said label insertion path of said carriage and being physically connected to said supporting base for said mold halves to move in unison therewith in a substantially fixed spatial relation therewith throughout the cycle of the blow molding machine; and a linear electric motor drive for said carriage comprising a linear stator assembly secured to said moveable linear support and extending along said insertion path, and an armature secured to the carriage for movement along said label insertion path, wherein during operation of said carriage the armature is in non-contacting electromagnetic communication with the stator.

2. A label inserter as defined in claim 1, wherein the linear electric motor drive is a brushless drive.

3. A label inserter ad defined in claim 1, wherein the armature of the linear electric motor drive is located on the underside of the carriage.

4. A label inserter as defined in claim 1, wherein the stator of the linear electric motor comprises a row of relatively thin permanent magnets of alternating polarity and said stator included multi-pole assemblies on opposite sides of the magnet row.

5. A label inserter as defined in claim 1, wherein the stator of the linear electric motor comprises a row of relatively thin permanent magnets of alternating polarity and said stator included multi-pole assemblies on opposite sides of the magnet row.

6. A label inserter as set forth in claim 1 wherein an encoder gauge provides position indications extending along the length of said stator, and said carriage has an associated signal generator adapted to providing position indications as feedback signals to a programmed control unit for said linear motor.

7. A label inserter as set forth in claim 1 wherein said label inserting beam extends forward in cantilevered relation from said carriage.

8. A label inserter as set forth in claim 7 wherein said label inserting beam comprises two closely spaced parallel side arms spaced apart a distance adequate to accommodate free passage of a parison therebetween.

9. A label inserter as set forth in claim 8 in which at least one label holder is present on each of said side arms facing in opposite directions for alignment and placement of labels in the recesses of opposite halves of said mold.

10. A label inserter as set forth in claim 9 in which the number of label holders on each said side arm corresponds to the number of mold cavities of a multiple cavity mold which is to be supplied with labels.

11. A label inserter as set forth in claim 10 in which means is provided for actuating the label holders on both sides of said beam in unison for release of a label in each of the recesses of said multiple cavity mold.

12. A label inserter as set forth in claim 7 including structural lift means by which said beam can be lifted vertically in its forward extending relation on said carriage.

13. A label inserter as set forth in claim 12 including lift actuating means located in a preselected region along said linear support for actuating said structural lift means to lift said beam upon movement of said carriage on said support in the region of said actuating means.

14. A label inserter as set forth in claim 13 wherein said beam extends forward horizontally and said structural lift means is arranged to lift said beam in its horizontal extending relation on said carriage.

15. A label inserter as set forth in claim 13 wherein said lift actuating means includes a contoured cam along said linear support and a cam follower member connected to said structural lift means engaging said cam.

16. A label inserter as set forth in claim 13 wherein said cam includes a longitudinal member extending adjacent and parallel to said linear support having a contoured cam groove therein engaged by said cam follower member for lifting said beam.

17. A label inserter as set forth in claim 7 in which said label holder is mounted on a vertically pivoted support arm at the side of said insert beam arranged to swing about its pivot laterally outward from the side of said beam.

18. A label inserter as set forth in claim 17 in which said support arm has an associated guide means for maintaining said label holder in outward facing relation at right angles to the side of said beam throughout the lateral outward swing of said support arm.

19. A label inserter as set forth in claim 18 in which said label holder is spring biased in its outward facing relation to provide a give in the holder upon contact of a label therein with a recess surface of a mold half.

20. A label inserter as set forth in claim 19 in which said label holder is vertically pivoted to permit lateral self adjustment of the face of said holder for full contact of a label on said holder with the recess surface of a mold half.

21. A label inserter as set forth in claim 11 in which said label holder includes suction means for holding a label on said holder.

22. A label inserter as set forth in claim 1 in which said label holder suction means is controllably turned on to receive and hold a label and turned off for release of a label in a mold recess.

23. A label inserter for supply of labels to a mold of a blow molding machine for the production of in-mold labeled synthetic resin products wherein mold halves having recesses defining a blow mold cavity have at least one inserted label therein are closed about a resin parison which is then blown to form a labeled product conforming to the mold cavity shape and then opened to release the labeled product, said label inserter comprising a carriage, a linear support for said carriage on which aid carriage can be advanced toward and retracted from the mold of such a machine during motion of the mold halves in preparation for molding, a linear drive distributed in aligned relation with said linear support including controls for controllably advancing and retracting and controllably stopping said carriage at any of a number of incremental preset locations along the length of said linear support, a label inserting beam extending forward of said carriage arranged to extend partially beyond a parison passing between said mold halves upon advance of said carriage and to be removed from between said mold halves upon retracting motion of said carriage, at least one label holder on said beam, a label supply means positioned to supply a label to said holder along said linear support a distance free from said mold, label holding means associated with said label holder operable to receive a label from said supply means and to hold said label on said holder, said label holding means being operable to release said label on the wall of the recess of one of said mold halves upon advancement of said carriage and insertion of said beam and label holder thereon between said mold halves;

wherein said linear distributed drive is a brushless drive including an armature on the underside of said carriage and a stator for said drive extending upwardly in non-contacting electromagnetic communication with said armature along the length of said linear support.

24. A label inserter as set forth in claim 23 wherein the stator of said linear drive includes a relatively thin row of permanent magnets of alternating polarity forming a magnet plane and said armature includes multi-pole coil assemblies on opposite sides of said magnet row.

25. A label inserter as set forth in claim 23 wherein an encoder gauge provides position indications extending along the length of said stator, and said carriage has an associated signal generator adapted to providing position indications as feedback signals to a programmed control unit for said linear motor.

26. A label inserter for supplying labels to a mold of a blow-molding machine for production of in-mold labeled synthetic resin products wherein mold halves having recesses defining a blow mold cavity adapted to receipt of at least one inserted label therein and are closed about a resin parisan which is then blown to form a labeled product conforming to the mold cavity shape and then opened to release the labelled product, said mold halves being located on a moveable supporting base, said label inserter comprising a label supply means;

a carriage carrying at least one label holder for removing a label from the label supply means and delivering the label to the mold, said carriage being arranged to move along an longitudinal path for insertion of labels in said mold halves;

a linear carriage support on which the carriage can be advanced toward and retracted from the mold, said linear carriage support extending along said path for insertion and being physically connected to said moveable supporting base to move in unison with said mold halves in a substantially fixed spatial relation therewith throughout the cycle of the blow molding machine;

a label insertion beam extending forwardly of said carriage to extend between the mold halves when open upon advance of said carriage and to be removed from between said mold halves on retraction of said carriage;

first supporting means for the supporting base of the mold halves for providing an inclined path of travel for said supporting base;

second supporting means for said linear carriage support for providing an inclined path of travel parallel to that of said supporting base, said linear carriage support being maintained in a substantially horizontal orientation throughout the cycle of operation of the blow molding machine;

structural lift means for lifting said beam in a vertical direction in its forwardly extending relation on said carriage, said structural lift means including a cam follower member; and a contoured cam located in at least one preselected region along the length of said linear carriage support, wherein during the advance of the carriage toward the mold the cam follower member of the structural lift means engages said contoured cam to lift said beam.

27. A label inserter as set forth in claim 26 wherein said inserter is moved in its path of movement by power supplied to the support base for said mold halves.

28. A label inserter for a blow molding machine as set forth in claim 26 wherein said label inserting beam extends forward in cantilevered relation from said carriage.

* * * * *